United States Patent
Chen (10) Patent No.: US 8,661,730 B2
(45) Date of Patent: Mar. 4, 2014

(54) MULTIFUNCTIONAL FLOWER CONTAINER

(76) Inventor: Hsin-Ming Chen, Taichung (TW)

( * ) Notice: Subject to any disclaimer, the term of this patent is extended or adjusted under 35 U.S.C. 154(b) by 0 days.

(21) Appl. No.: 13/464,031

(22) Filed: May 4, 2012

(65) Prior Publication Data
US 2012/0279124 A1 Nov. 8, 2012

(30) Foreign Application Priority Data

May 6, 2011 (TW) .................................. 100208184

(51) Int. Cl.
*A01G 9/02* (2006.01)
(52) U.S. Cl.
USPC ............................................... 47/66.6; 47/39
(58) Field of Classification Search
USPC ........ 47/66.6, 39, 40.5, 41.01, 59 R, 62 R, 63
IPC ..................................... A47G 7/00; A01G 69/02
See application file for complete search history.

(56) References Cited

U.S. PATENT DOCUMENTS

| | | | | |
|---|---|---|---|---|
| 1,579,305 A | * | 4/1926 | Goldberg | 362/101 |
| 4,175,354 A | * | 11/1979 | Anderson | 47/39 |
| 4,850,386 A | * | 7/1989 | Bireley | 137/78.3 |
| 4,969,290 A | * | 11/1990 | Skoretz | 47/39 |
| 5,152,099 A | * | 10/1992 | Nilssen | 47/65 |
| 5,547,721 A | * | 8/1996 | Kuo | 428/34.1 |
| 6,128,854 A | * | 10/2000 | Chaney | 47/39 |
| 6,594,951 B1 | * | 7/2003 | Reynolds | 47/39 |
| 8,166,701 B1 | * | 5/2012 | Duff, Sr. | 47/39 |
| 8,356,445 B1 | * | 1/2013 | Colquhoun | 47/65 |
| 2006/0213121 A1 | * | 9/2006 | Mercado et al. | 47/40.5 |
| 2008/0083163 A1 | * | 4/2008 | Amsellem et al. | 47/66.6 |
| 2008/0276534 A1 | * | 11/2008 | Bissonnette et al. | 47/62 R |
| 2009/0084032 A1 | * | 4/2009 | Beeman et al. | 47/39 |
| 2009/0151248 A1 | * | 6/2009 | Bissonnette et al. | 47/59 S |
| 2011/0010990 A1 | * | 1/2011 | Richardson | 47/65.7 |

* cited by examiner

*Primary Examiner* — Shadi Baniani
(74) *Attorney, Agent, or Firm* — Jackson IPG PLLC (57) ABSTRACT

The present invention provides a versatile flower container includes a base, a top cover, a carrying container placing on the top of top cover and a sensing device placing in the base, the carrying container has a concave space can be used to accommodate the sponge, floral and water, the sensing device includes an electronic control panel, two humidity detection rod, a number of lamps and speakers, the two humidity detection rods are through the top cover and inserting into the sponge in the concave space, thereby they can detect the humidity values of the sponge, the lamps and the speaker can be activated to produce light and sound and then generate warning effect when the humidity values are not enough in the carrying container.

3 Claims, 8 Drawing Sheets

MULTIFUNCTIONAL FLOWER CONTAINER

BACKGROUND OF THE INVENTION

1. Field of the Invention

The present invention is related to the flower container and more particularly to a multifunctional flower container.

2. Description of the Related Art

Human beings are independent animals, and you're thirsty to drink water to pour, the plant must rely on human help, but often happens is that a human being busy, you will not forget to help water the plants, resulting in plant dry dead another situation is continuing to help spend adding water, in turn caused by the ulceration of the roots of plants help so flower water is also one of learning, excess and deficiency are not right! Therefore, if there is a device that can detect flower water in the container the amount of copies, and in a timely manner issued a warning to remind mankind of the bunch of plants, add water, the plant will naturally keep plenty of water the state, not only can be engraved with the service of mankind forget to help plant and the mischief of the water, and avoid letting the plant dry dead, more can prevent too often add water and lead to rotting.

Currently, there is some large-scale planting equipment with humidity sensing function and patents, but there is not any small flower container having the humidity sensor and warning functions for general home to use.

SUMMARY OF THE INVENTION

The main purpose of the present invention to provide a multifunctional flower container, its small size, compact design, and available for general household use, and can detect humidity and issued the message of the sound and lights to alert the user to add water to plants in a timely manner more at the same time as the indoor lighting tool, changes in indoor lighting automatically start illuminated during power outages or in the dark alone remove some elements of handheld lighting to help see the surrounding objects to avoid danger to produce practical value is very good.

According to the objectives of the present invention, a multifunctional flower container comprising a base having a hold space; a cover film, making of opaque material, setting at the top of the base to closed the hold space; a carrying container, setting at the top of the cover film, including a recessed space to accommodate some sponge, floral and water; a sensing device, setting up within the hold space, including the electrical connection of the two humidity detection rod and a number of lamps, a speaker, the two humidity detection rods are through the top cover and inserting into the sponge in the concave space, thereby they can detect the humidity values of the sponge, the lamps and the speaker can be activated to produce light and sound.

DETAILED DESCRIPTION OF THE INVENTION

Figure 1:
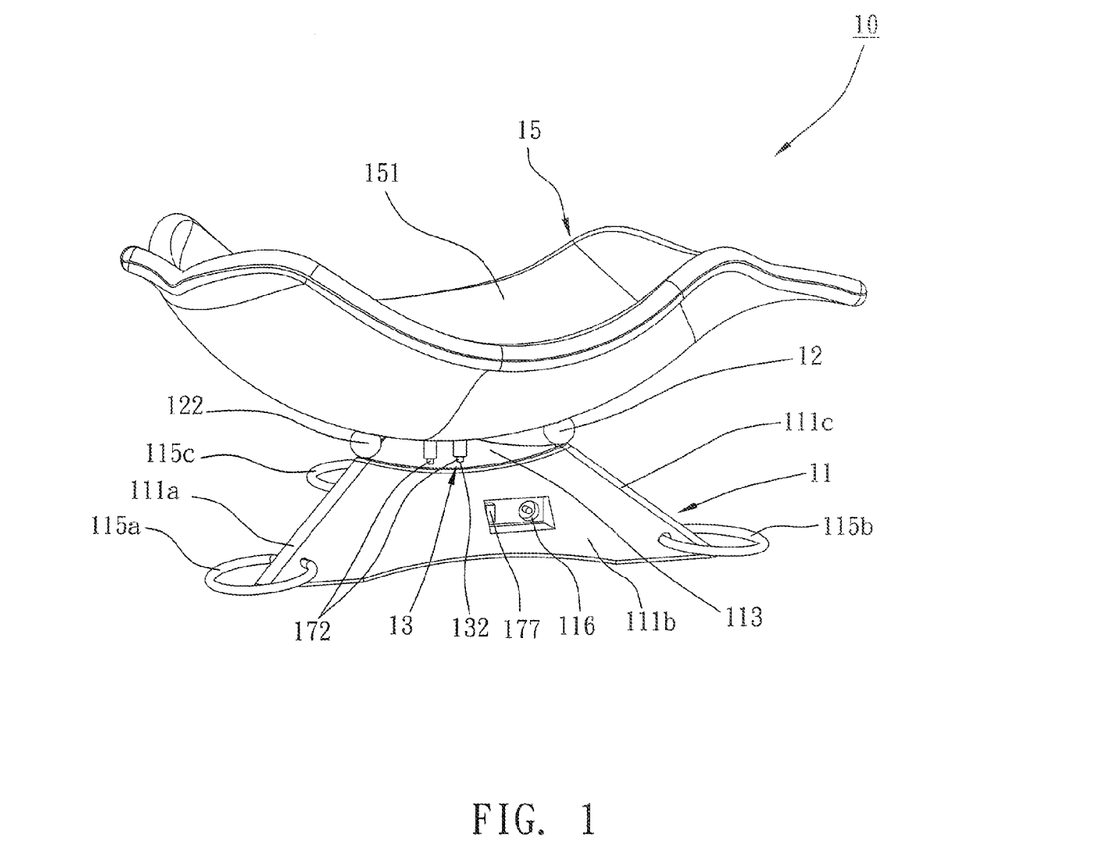
FIG. 1 is a side view of a first preferred embodiment of the present invention.
Figure 2:
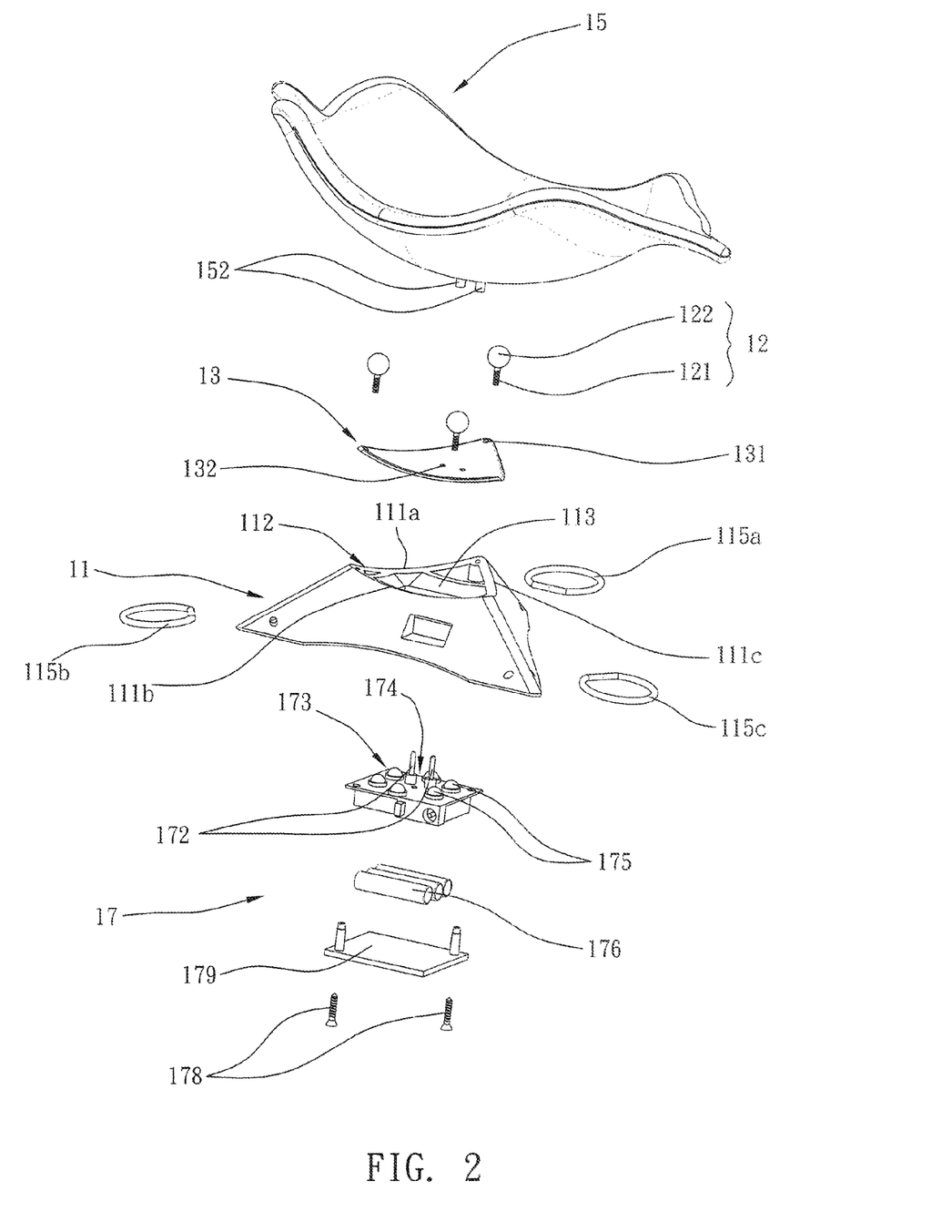
FIG. 2 is a three-dimensional exploded view of the first preferred embodiment of the present invention.
Figure 3:
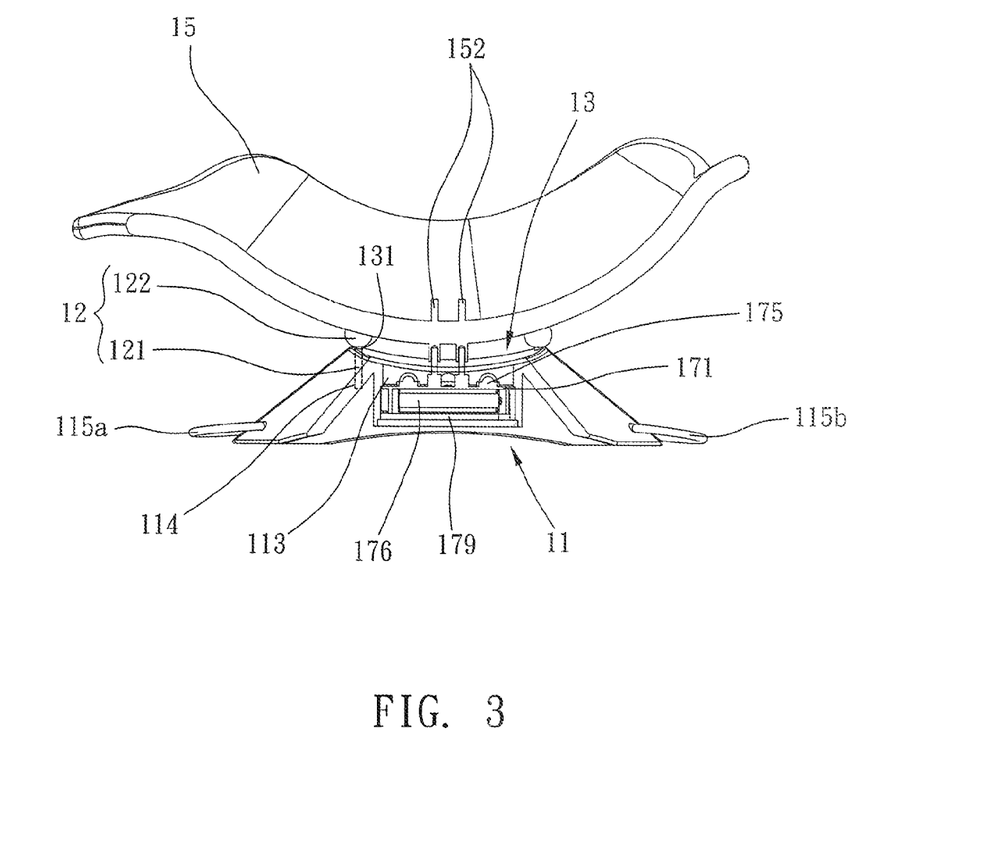
FIG. 3 is a partial cutaway view of the first preferred embodiment of the present invention.

Referring to FIGS. 1 to 3, the first better implementation of the invention the case of multi-functional flower container 10 comprises a base 11, a cover film 13, a carrying container 15 and a sensing device 17.

The base 11 having three concave side 111a~c, once on the opening 112 and opening 112 side by the downward extension of set one of the hold space 113; and adjacent to the concave arc edge 111a and 111b, 111b and 111c, 111c and 111a, respectively wear hub was the ring-shaped rings 115a~c, providing the purpose of hanging the base 11 of one concave side 111a and has a plug hole 116, available for an external power source (not shown) and the insertion of the sensing device 17 electrical connection.

The cover film 13 is making of an optical transparent material, setting at a opening 112 of the base 11, by several groups based components were a group of connected part 121 through the perforated cover film 13 131 base 11 screw within the 114 screw access, and then closed the base 11 of the hold space 113, while 12 of the top of the set components with spherical one holding part 122, Department of arrival to the carrying container 15 the bottom of the erected; another, cover film 13 the central part of the superstructure has two wear set of holes 132.

Figure 7:
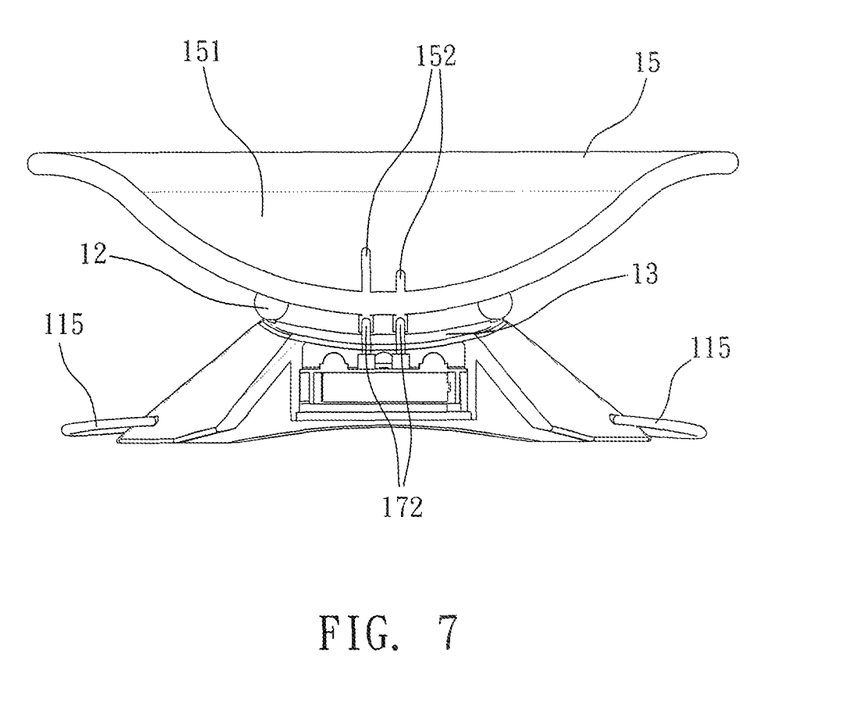
FIG. 7 is a partial cutaway view of the third preferred embodiment of the present invention.
Figure 8:
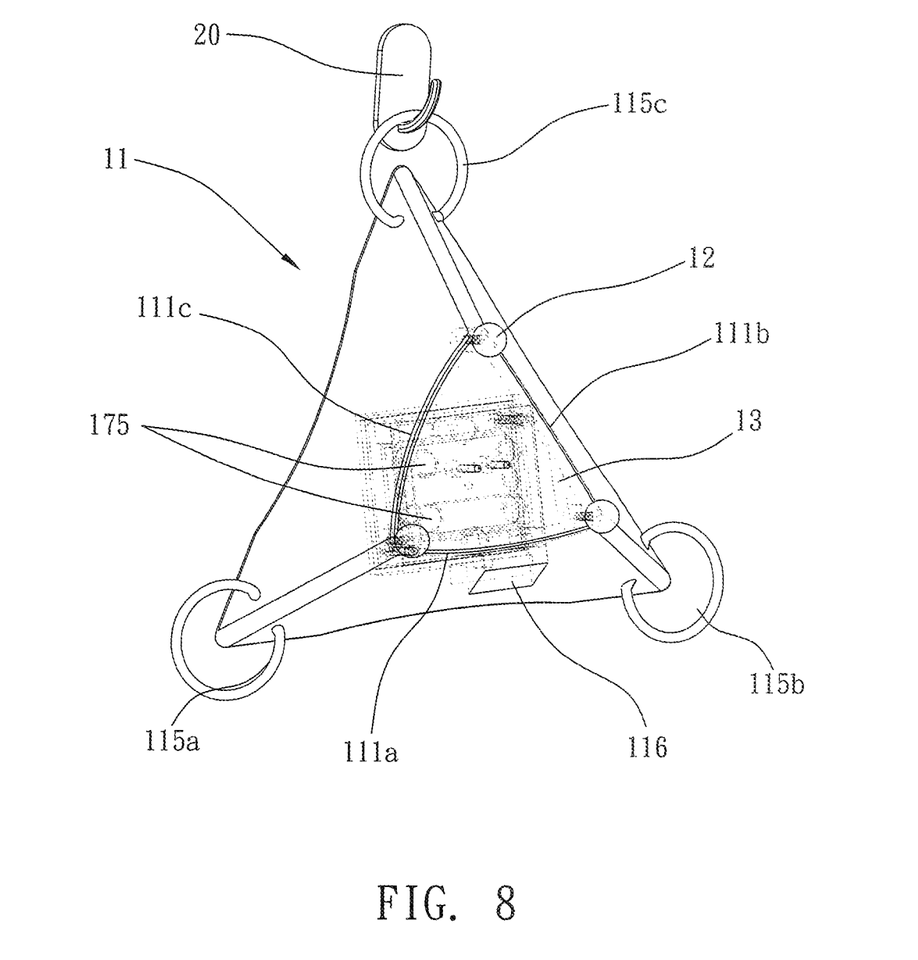
FIG. 8 is a using state view of the third preferred embodiment of the present invention.

The carrying container 15 has a concave space 151, is available for floral, floral arrangement (for example, absorbent sponge, etc.) and liquid water capacity installed and the group set its internal group located at the top of the base 11 held part 122, and the other, the carrying container 15 has a convex extension to the concave space 151 plug part 152, and, Referring to FIG. 7, the second preferred embodiment of the present invention, the carrying container 15 can be set to a disc shape, Referring to FIG. 8, the third preferred embodiment of the present invention, where the carrying container 15 is set to a rectangular.

The sensing device 17, set in the base 11 of the hold space 113, the use of a bottom cover 179 and the number of bolts 178 from the bottom of the lock pick and fixed detection lever 172 includes an electronic control panel 171 is electrically connected to two light sensing element 173, a speaker 174 and lamps 175 (LED), and can set up another battery power source 176 and a control switch 177. Two humidity detection lever 172 through the top cover 13 to wear a set hole 132 and the plug group carrying container 15 of the plug portion 152 and convex stretch in the concave space 151, the use of the plug portion 152 as a connection terminal with humidity detection lever 172 to complete the electrical connection; the humidity detection lever 172 can also detect the movement speed of the hydrogen ions in the concave space 151, the concave space 151 in the water for a long time, hydrogen ions move faster, on the contrary, when the detected hydrogen ions move slower indicates less moisture in the concave space 151, it will immediately start the speaker 174 and lamp 175, for the sound and light, and then to remind to add water to the carrying container 15. The control switch 177 can switch the sensing device 17 to produce a three-stage action of ON, OFF and AUTO; the light sensing elements 173 Series CDS photosensitive resistor, electrically connected to the electronic control panel 171. It must be noted that the structure and operation principle of the sensing device 17, all electronic components, is a practice known technology and not the main features of the present invention skills, this is not more repeat.

In this way, the way to use the multi-functional flower characteristics and effects are as follows:

The carrying container 15 is the group located at the base 11 the top by the top hold the top part of the 121 held that the sense of measuring device 17, two humidity detection lever 172 corresponds to the insert carrying container 15 the second plug part 152 to complete the electrical connection, a sponge and placed in the concave space 151, but based on personal preferences for the variety of floral inserted in the sponge on, and add water to the sponge in order to provide the floral required water.

The multifunctional flower container 10 by the base 11 of the plug hole 116 connecting the utility to install a number of battery 176 is also available on the sensing device 17 to provide electricity to the sense of measuring device 17, so that the convex extension the concave space 151 humidity detection lever 172 can detect the amount of water (using the speed of the movement of hydrogen ions in the water molecules to distinguish), to detect the data below the set value (the hydrogen ion moving slower), start the speaker 174 sounds, 175 light-emitting lamps used to generate a warning signal to remind users to add water. In addition, when the light sensing element 173 sensitive to low light that will transmit signals to the electronic control panel 171, thereby starting the lamp 175,191.

Based on this, the multifunctional flower container 10 will not produce flower container because forget add water leaving the plant withered the situation, the speaker actuator 174 and lamps 175, you can not add water, but does not produce a result of adding water over soaked rotting of the roots, completely remove conventional mischief, to reach the expected purpose of the invention.

Figure 4:
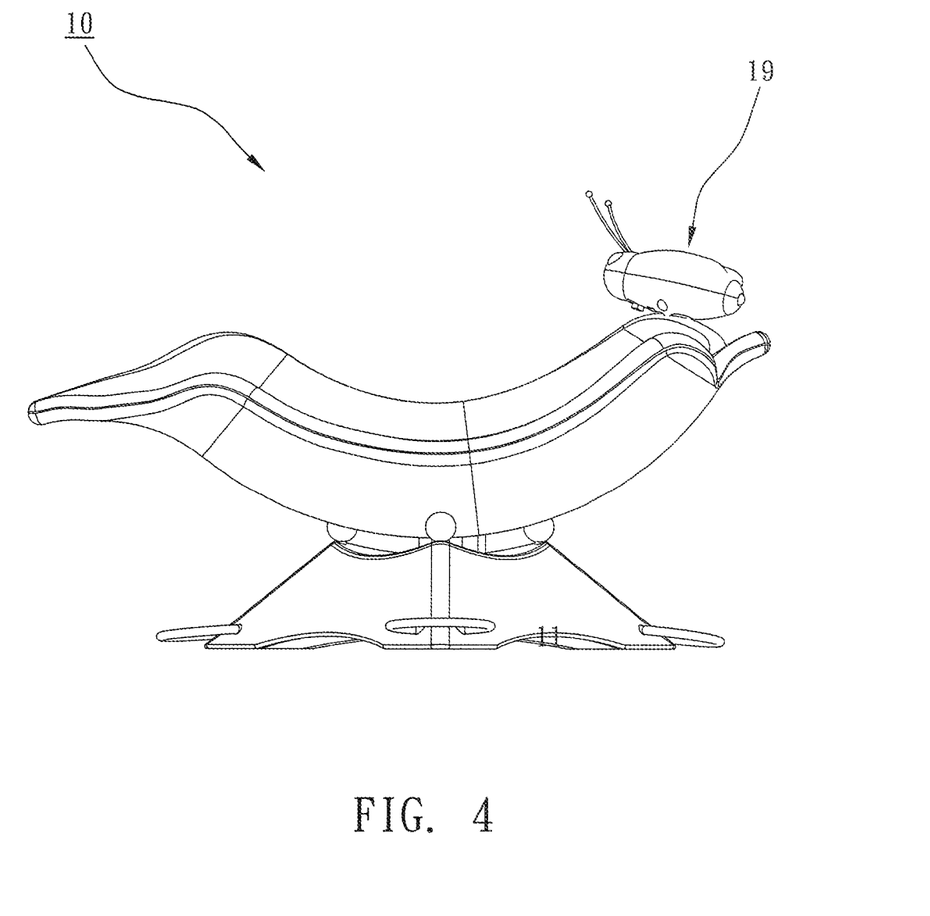
FIG. 4 is a side view of a second preferred embodiment of the present invention.
Figure 5:
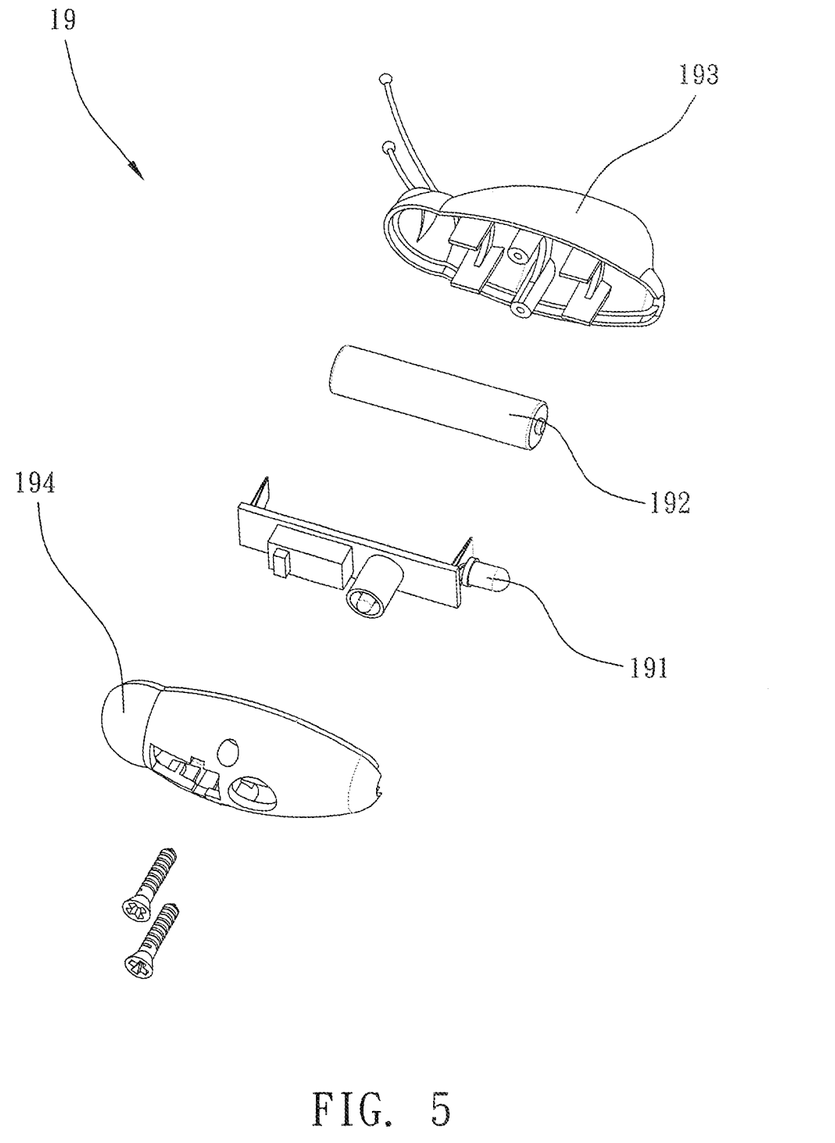
FIG. 5 is a three-dimensional exploded view of a hand-held lighting of the second preferred embodiment of the present invention.

In addition, see Figure fourth and fifth shown, the multifunctional flower container 10 can also includes a handheld lighting 19, is removable to set the edge of carrying container 15 and use a wire and the sensing device 17 electrically connected, the hand-held lighting fixture 21 includes at least one lamp 191 (LED lights), a charging component 192 and the shell 193,194 coating lamps 191 and the rechargeable element 192.

When the light sensing element 173 is sensitive to low light, the lamp 191 can also be illuminated to further strengthen prompts the user to be added to the water signal. Secondly, when the power outages of the sensing device 17 (such as power outages), the hand-held lighting fixture 19 can also be luminous, but are available separately removed to use as an additional lighting instruments. And the shell 193,194 can be design was lovely insect shape, such as ladybugs, butterflies or bees shape docked on the carrying container 15, increasing the appearance of the multi-functional flower appearance.

Figure 6:
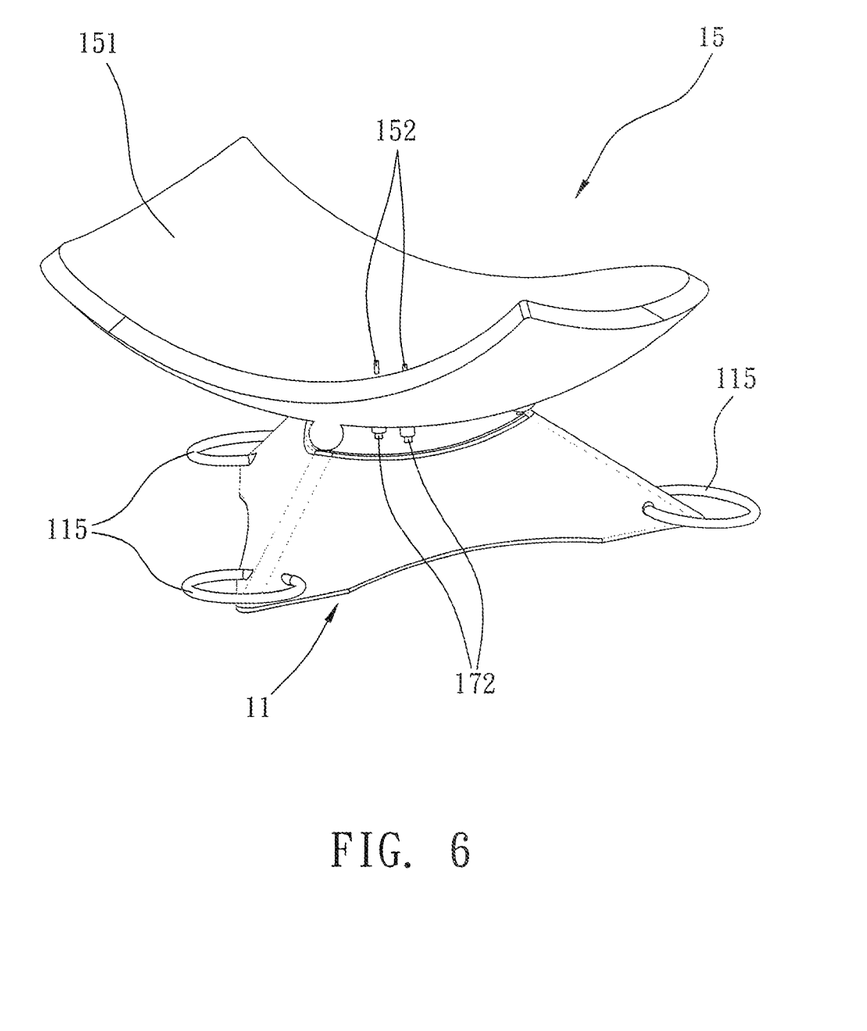
FIG. 6 is a three-dimensional map of a third preferred embodiment of the present invention.

As shown in FIGS. 6 to 8, the present invention multifunction flower container 10 of the base 11 can also be used alone, in addition to flat on the desktop, can take advantage of a rings 115 chook hanging on the wall hook 20, tie in with the lamp 175 as a decorative lighting tools.

In summary, the present invention to provide multi-functional flower container, which can detect humidity and to remind the user to the message of sound and lighting in a timely manner on the plant and water, can be used as indoor lighting tool in response to indoor lighting changes automatically start lighting can also be individually removed as a hand-held lights, with very good practical value.

What is claimed is:

1. A multifunctional flower container, comprising:
    a base having a hold space;
    wherein a bottom side of the base has a number of rings;
    a cover film, made of opaque material, set at a top of the base to close the hold space;
    a carrying container, set at a top of the cover film, including a concave space to accommodate flowers and water; and wherein the cover film has a plurality of set holes, and a bottom of the carrying container has at least one plug part corresponding to at least one of the plurality of set holes;
    a sensing device, set within the hold space, including two humidity detection rods and a light sensing element electrically connected to a number of lamps, a speaker, and a control switch;
    wherein the two humidity detection rods extend through the top of the cover film and into the at least one plug part of the carrying container and insert into the concave space of the carrying container, thereby the two humidity detection rods can detect humidity in the concave space of the carrying container,
    the number of lamps and the speaker are configured to produce light and sound when the humidity has decreased below a set value in the carrying container.

2. The multifunctional flower container as defined in claim 1, further comprising
    a hand-held lighting device, removably located in an edge of the carrying container and the sensing device is electrically connected to a charging element.

3. The multifunctional flower container as defined in claim 1,
    wherein the top side of the cover film has a plurality of set elements, the set elements touch the bottom of the carrying container, each set element respectively contains a connected part and a holding part, the connected part extends through a hole of the plurality of set holes in the cover film, the holding part supports the bottom of the carrying container.

* * * * *